United States Patent [19]

Rienecker

[11] Patent Number: 4,863,605

[45] Date of Patent: Sep. 5, 1989

[54] HYDROCYCLONE WITH PARALLEL ROTOR VANES AND ANNULAR RING MEMBERS

[75] Inventor: Raimund Rienecker, Heidenheim, Fed. Rep. of Germany

[73] Assignee: The United States of America as represented by the Secretary of the Navy, Washington, D.C.

[21] Appl. No.: 213,087

[22] Filed: Jun. 29, 1988

[30] Foreign Application Priority Data

Jun. 29, 1987 [DE] Fed. Rep. of Germany ....... 3721401

[51] Int. Cl.[4] .......................... B04C 3/06; B01D 21/26

[52] U.S. Cl. ................................. 210/512.3; 209/211; 209/144

[58] Field of Search .......................... 210/512.3, 512.1; 209/211, 144

[56] References Cited

U.S. PATENT DOCUMENTS

| | | | |
|---|---|---|---|
| 2,199,015 | 4/1940 | Toensfeldt | 209/144 |
| 2,702,632 | 2/1955 | Scott | 209/144 |
| 2,996,187 | 8/1961 | Payne | 209/211 |
| 3,423,034 | 1/1969 | Hippert | 209/144 |
| 3,501,001 | 3/1970 | Müller et al. | 210/512.1 |
| 3,615,008 | 10/1971 | Alpha | 209/144 |
| 3,670,886 | 6/1972 | Hosokawa et al. | 209/144 |
| 3,770,124 | 11/1973 | Frangquist | 209/144 |
| 4,094,794 | 6/1978 | Kahmann | 210/512.1 |
| 4,107,033 | 8/1978 | Holz | 209/211 |
| 4,216,918 | 8/1980 | Kahmann et al. | 209/211 |

FOREIGN PATENT DOCUMENTS

| | | | |
|---|---|---|---|
| K23813III/8-2b | 2/1956 | Fed. Rep. of Germany | 210/512.3 |
| 877628 | 9/1961 | United Kingdom | 210/512.3 |
| 1209686 | 10/1970 | United Kingdom . | |

*Primary Examiner*—Richard V. Fisher
*Assistant Examiner*—Cynthia L. Nessler
*Attorney, Agent, or Firm*—Kenneth E. Walden; Roger D. Johnson

[57] ABSTRACT

A hydrocyclone having an inlet opening toward its upper part. A hollow rotor inside the upper part of the cyclone has a bottom end. An accepts removal tube has an entrance opening that projects up inside the hollow rotor and the bottom end portion of the rotor overlaps the accepts removal tube a short distance below the entrance opening. This defines sharp direction changes in the flow path of stock past the outside of the rotor to the entrance opening of the accepts removal tube. Conveyor ribs may be defined on the exterior and on the inner wall of the drum. Annular thickenings at the bottom of the drum and at the exterior of the accepts removal tube near the entrance opening constrict the pathway for the stock and enhance separation of heavy materials from the stock.

15 Claims, 1 Drawing Sheet

Fig. 1
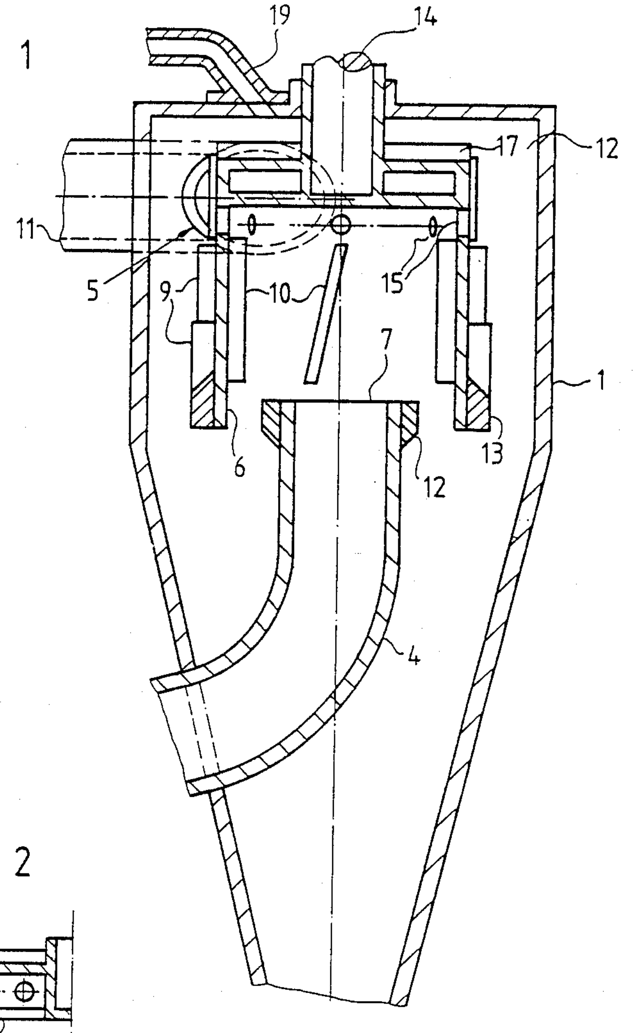
Fig. 2
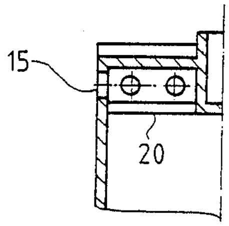
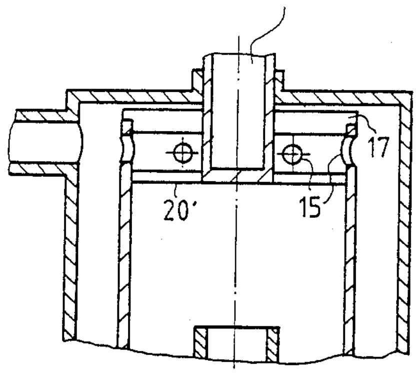
Fig. 3

HYDROCYCLONE WITH PARALLEL ROTOR VANES AND ANNULAR RING MEMBERS

BACKGROUND OF THE INVENTION

The present invention relates to a hydrocyclone and particularly a hydrocyclone with a rotor and with an accepts removal tube having an entrance near the rotor. Such a cyclone is known from Austrian Patent 328,851. In that hydrocyclone, there is a rotor that conducts the accepts into the accepts chamber through a removal channel formed in the rotor. On its outer periphery, the rotor has conveyor vanes which support the turbulent flow. The tangential inlet to the cyclone is provided in this region of the rotor. In general, the inlet is at the top of the cyclone, and it is preferably arranged vertically. The heavy dirt outlet accordingly naturally discharges in the lower region of the cyclone. An increased amount of heavy dirt is to be removed by means of this hydrocyclone. The operating range of such cyclones lies approximately in the medium consistency range of between 1.5 and 4%.

Due to the high consistency of the stock moving through the cyclone, the removal of the heavy materials is relatively poor. The stock has good carrying properties as a vehicle so that it carries even relatively large heavy particles into the accepts region. Furthermore, direct short circuiting is possible if the rotor is made relatively flat, i.e. short in height, so that the main stream of the stock extends directly from the inlet to the accepts tube. In the cyclone described above, a reversal of flow direction is present from the inlet to the accepts tube. But the short circuit flow cannot thereby be prevented.

SUMMARY OF THE INVENTION

The object of the present invention is to improve the separating by such a hydrocyclone of the heavy particles from the stock.

Another object is to redirect the flow of stock for separation of accepts from heavier particles.

A further object is to avoid a short circuit from the cyclone inlet to the accepts tube.

These objects are achieved in a hydrocyclone of the aforementioned type by means of the features now described. The hydrocyclone according to the invention has a generally cylindrical upper part which leads into a conically tapering, frustoconical lower part and has an outlet for the heavy dirt at the bottom of the lower part. A hollow drum like or cylindrical rotor is disposed in the upper, cylindrical part. A support and drive for the rotor rotates the rotor in the cyclone. An inlet to the cyclone enters a side thereof tangentially at the upper part and is directed so that the entering material impinges upon the exterior of the rotor toward its top end.

The rotor is provided with conveyor ribs or vanes upon its exterior and extending substantially parallel to the generatrix of the rotor drum, which conveys the entering materials in swirling fashion around the rotor. In this connection, the rotor may also have internal blades or vanes which also extend substantially parallel to the generatrix of the rotor drum on the inner wall of the rotor. The ribs on the interior of the rotor drum also enhance the circulation of the liquid material inside the rotor, which improves the cyclone operation.

To prevent accumulation of entering material on the exterior of the rotor drum at its top, the rotor may have a series of openings around it. These are outlet openings which permit liquid inside the rotor to exit, and the exiting liquid provides an outward flow which pushes away or washes away material accumulated on the exterior of the rotor. Accumulation between the upper end wall of the rotor and the closed end wall of the hydrocyclone may also be prevented by conveyor elements provided on the rotor or by additional spray of water discharged against the top of the rotor.

There is an accepts tube which conducts accepts out of the hydrocyclone. The accepts tube has an entrance opening that is located in the region of the rotor and particularly extends into the open bottom of the rotor. The entrance opening is located at such height and the open end of the rotor extends down to such height that the bottom end of the rotor extends further down in the cyclone than the entrance opening of the accepts tube and the bottom portion of the rotor overlaps the portion of the accepts removal tube below the entrance opening. This provides two sharp curves in the flow pathway of the stock, which helps to keep the heavier dirt particles from moving down around the outside of the rotor past the bottom end thereof and up to the accepts tube entrance opening.

In various different embodiments of the hydrocyclone, the upper end of the rotor adjacent the entrance opening of the cyclone may be closed or may be opened, depending upon the desired design. Support ribs may be provided on the drum in the region of its upper end. Outlet openings of the rotor drum are located behind those ribs.

To further enhance the separation of the heavy materials from the stock, the pathway of the material moving to the entrance opening of the accepts tube is constricted at locations. Those constrictions also increase the speed of the flow of the stock therepast as the direction of movement of the stock toward the accepts opening is changing, which enhances the separation of heavy materials from the stock flow. The constrictions are accomplished, for example, by thickening the rotor at its lower end and/or by thickening the periphery of the accpets tube near its entrance opening, and these thickenings are both located adjacent the regions where the stock flow changes direction.

Short circuited flow is substantially avoided with the invention, since the heavy parts cannot participate in a sharp deflection.

Other objects and features of the invention are explained below with reference to an embodiment shown in the drawings.

BRIEF DESCRIPTION OF THE DRAWINGS

FIG. 1 is a cross-section through a hydrocyclone of the invention; and

FIGS. 2 and 3 each show a corresponding portion of the entrance region of other variants of the hydrocyclone and the rotor.

DESCRIPTION OF THE PREFERRED EMBODIMENTS

The hydrocyclone 1 shown in FIG. 1 has a usual internal profile of a generally cylindrical top portion merging into a generally frustoconical bottom portion terminating in an open bottom end.

The cyclone has an inlet 11 comprising a tube which enters the cyclone near its top end, from a side and generally tangentially. There is a drum like, hollow rotor 6 which is arranged in this entrance region near the top of the cyclone. Material entering the cyclone from the inlet 11 at the side impinges upon the exterior of the rotor. The rotor 6 is driven by a shaft 14 that is affixed to the rotor and passes into the top of the cyclone. The region of the housing of the cyclone 1 containing the rotor is substantially cylindrical. Its shape tapers conically toward the bottom to the outlet end for the heavy particles.

There is an accepts removal tube 4 that passes upward through the cyclone from the bottom, conical region. It has an entrance portion that extends up a distance into the rotor drum 6. It has an upwardly facing entrance opening 7 at the top of the entrance portion inside the rotor. The rotor bottom portion overlaps a short distance over the entrance portion of the accepts removal tube 4. The overlap can amount to about 10% to 20% of the inside diameter of or to about 5% to 15% of the total length of the rotor drum 6. The inside diameter of the rotor drum 6 amounts to between about 55% and 70% of the inside diameter of the cylindrical part of the hydrocyclone 1. The outside diameter of the rotor 6 is in the range between 56% to 75% of the inside diameter of the top part of the hydrocyclone. The above described overlap provides two sharp curves in the flow pathway of the stock, helping to separate the heavier particles from the stock flow.

In the transition region between the outside of the rotor drum 6 and the inlet opening 7 of the accepts tube 4, the cross-sections of the flow pathway are constricted by respective annular thickenings (or annular rings) 12 and 13 on the accepts tube 4 and the rotor drum 6. Each constriction correspondingly increases the velocity of stock flow so that even better separation of the heavy particles from the stock flow can be obtained.

In order to improve the rotation flow, vanes or conveyor elements 9, which extend substantially parallel to the generatrix of the rotor drum 6, are arranged on the outside of the rotor drum. Such vanes 10 possibly additionally may be arranged on the inside of the rotor drum for the same reason.

In FIG. 1, the rotor drum is closed at its upper end, that is, in the region of the cyclone inlet 11. Small openings 15 in the drum wall prevent substances from accumulating at the upper end opposite the inlet because liquid inside the drum flows outward though those small openings 15 and pushes or washes accumulated materials away. Accumulation between the end wall of the rotor drum and the closed end wall of the cylindrical part of the hydrocyclone is preventd by conveyor elements 17, which may be developed as radial ribs. Furthermore the accumulation of substances in this region can also be prevented by spray water dispersed through a feed pipe 19.

In the modified embodiment of FIG. 2, the rotor drum is furthermore provided with support ribs 20 in the region of its upper closed end. The outlet openings 15 of the rotor drum are located behind those ribs, as seen in the axial direction.

In the further modified embodiment shown in FIG. 3, support ribs 20' are also provided. Here, the rotor is open at both ends and is further held on the shaft 14' by the radial conveyor ribs 17'.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A hydrocyclone, comprising:

a cyclone body including a top portion and including a bottom portion continuing downward from the top portion, the bottom portion being generally conically tapered, and the bottom portion having a lower end which is open;

an inlet opening to the top portion of the cyclone for entrance of stock to be treated in the cyclone;

a rotor disposed in the top portion of the cyclone, and means for rotating the rotor in the top portion of the cyclone; the rotor including a cylindrical wall, the cylindrical wall defining an open interior and a bottom end which is open;

an accepts removal tube having an entrance opening located in the cyclone and extending into the open bottom end of the rotor, the entrance opening extending up far enough into the top portion of the cyclone and the rotor having a bottom end extending down far enough in the cyclone that the bottom portion of the rotor overlaps a portion of the accepts removal tube below the entrance opening, whereby stock passing from outside the rotor to the entrance opening of the accepts removal tube follows a pathway with two sharp curves at the bottom end of the rotor and at the entrance opening to the accepts removal tube, for enhancing the separation of heavy materials from the stock; and the hydrocyclone further comprising conveyor vanes defined on the exterior of the rotor wall and extending substantially parallel to the generatrix of the rotor for conveying stock around the rotor as the rotor rotates.

2. The hydrocyclone of claim 1, wherein the top portion of the cyclone is generally cylindrically shaped.

3. The hydrocyclone of claim 2, wherein the accepts removal tube extends down in the cyclone from the entrance opening of the accepts removal tube and through the cyclone substantially to the bottom end of the bottom portion of the cyclone and the accepts removal tube there extends out of the cyclone.

4. The hydrocyclone of claim 1, wherein the rotor is hollow and has an interior; with additional conveyor vanes defined on the interior of the cylindrical wall of the rotor and extending substantially parallel to the generatrix of the rotor.

5. The hydrocyclone of claim 1, wherein the rotor has a top end facing the top of the cyclone, and the top end of the rotor is closed.

6. The hydrocyclone of claim 1, wherein the rotor has a top end facing the top of the cyclone, and the top end of the rotor is open.

7. The hydrocyclone of claim 1, further comprising means in the cyclone for preventing accumulation of material entering the cyclone upon the rotor.

8. The hydrocyclone of claim 7, wherein the accumulation prevention means comprises a plurality of openings through the rotor from the interior to the exterior thereof generally at the top end portion of the rotor toward which the inlet opening to the hydrocyclone is directed.

9. The hydrocyclone of claim 1, further comprising means for constricting the cross-section of the pathway of stock from the inlet opening of stock into the cyclone to the entrance opening of the removal tube, for increasing the velocity of the stock moving past the constrictions for enhancing separation of heavy materials from the stock.

10. The hydrocyclone of claim 9, wherein the top portion of the cyclone body has a cylindrical inner surface and wherein the constricting means comprises an annular ring disposed on the cylindrical wall of the rotor in the region of the bottom end thereof, for narrowing the pathway past the annular ring.

11. The hydrocyclone of claim 10, wherein the annular ring faces outwardly for constricting the pathway of the stock between the bottom end of the rotor and the interior of the cyclone as the stock moves past and around the bottom end of the rotor.

12. The hydrocyclone of claim 10, wherein the constricting means also comprises a second annular ring disposed on the accepts removal tube generally toward the entrance opening, which constricts the cross-section of the pathway of the stock between the rotor and the accepts removal tube in the region of their overlap.

13. The hydrocyclone of claim 9, wherein the constricting means comprises an annular ring disposed on the accepts removal tube generally toward the entrance opening, which constricts the cross-section of the pathway of the stock between the rotor and the accepts removal tube in the region of their overlap.

14. A hydrocyclone, comprising:

a cyclone body including a top portion and a bottom portion continuing downward from said top portion, said bottom portion being generally conically tapered, said bottom portion having a lower end which is open;

an inlet opening to said top portion of said cyclone body for entrance of stock to be treated;

a tubular rotor disposed in said top portion of said cyclone body, and means for rotating said tubular rotor in said top portion of said cyclone body; said tubular rotor having an open interior and a bottom end which is open;

an accepts removal tube having an entrance opening located in said cyclone body and extending into said open bottom end of said tubular rotor, said entrance opening of said accepts removal tube extending up far enough into said top portion of said cyclone body and said tubular rotor having a bottom end extending down far enough in said cyclone body that said bottom portion of said tubular rotor overlaps a portion of said accepts removal tube below said entrance opening of said accepts removal tube, whereby stock passing from outside said tubular rotor to said entrance opening of said accepts removal tube follows a pathway with two sharp curves at said bottom end of said tubular rotor and at said entrance opening of said accepts removal tube, for enhancing the separation of heavy materials from the stock; and wherein the extent of overlap of said tubular rotor along said accepts removal tube is in the range of about 10% to 20% of the inside diameter of the total length of said tubular rotor; and wherein the length of the overlapping region of said tubular rotor along said accepts removal tube below said entrance opening of said accepts removal tube is in the range of about 5% to 15% of the total length of said tubular rotor; and wherein the inside diameter of the rotor is in the range between about 55% to 70% of the inside diameter of the top part of the hydrocyclone.

15. The hydrocyclone of claim 14 wherein the outside diameter of the rotor is in the range between 56% to 75% of the inside diameter of the top part of the hydrocyclone.

* * * * *